United States Patent
Fries et al.

(10) Patent No.: US 12,457,004 B2
(45) Date of Patent: Oct. 28, 2025

(54) ANTENNA SYSTEM

(71) Applicant: Harman Becker Automotive Systems GmbH, Karlsbad (DE)

(72) Inventors: Dirk Fries, Straubenhardt (DE); Alexey Defer, Rheinstetten (DE)

(73) Assignee: HARMAN BECKER AUTOMOTIVE SYSTEMS GMBH, Karlsbad-Ittersbach (DE)

( * ) Notice: Subject to any disclaimer, the term of this patent is extended or adjusted under 35 U.S.C. 154(b) by 471 days.

(21) Appl. No.: 17/998,646

(22) PCT Filed: May 15, 2020

(86) PCT No.: PCT/EP2020/063674
§ 371 (c)(1),
(2) Date: Nov. 11, 2022

(87) PCT Pub. No.: WO2021/228409
PCT Pub. Date: Nov. 18, 2021

(65) Prior Publication Data
US 2023/0353190 A1    Nov. 2, 2023

(51) Int. Cl.
*H04B 1/18* (2006.01)
*H04B 1/58* (2006.01)

(52) U.S. Cl.
CPC .................................. *H04B 1/586* (2013.01)

(58) Field of Classification Search
CPC .. H04B 1/586; H04B 1/04; H04B 2001/0408;
H04B 2001/0416; H04B 2001/0433;
(Continued)

(56) References Cited

U.S. PATENT DOCUMENTS

| 2006/0045037 A1* | 3/2006 | Nomura | G06F 13/385 |
| | | | 370/315 |
| 2008/0051042 A1* | 2/2008 | Komaili | H03F 1/3288 |
| | | | 455/114.3 |

(Continued)

FOREIGN PATENT DOCUMENTS

| DE | 102017218565 A1 | 4/2019 |
| EP | 2983298 A2 | 2/2016 |
| EP | 3331316 A1 | 6/2018 |

OTHER PUBLICATIONS

ISA European Patent Office, International Search Report Issued in Application No. PCT/EP2020/063674, Jun. 26, 2020, WIPO 3 pages.

*Primary Examiner* — Tuan Pham
(74) *Attorney, Agent, or Firm* — McCoy Russell LLP

(57) ABSTRACT

The disclosure relates to an antenna system comprising: a transceiver & control unit configured to control the antenna system and to generate a RF transceiver signal; a compensator connected to the transceiver & control unit through a connecting line, the compensator being configured to compensate for signal losses occurring for the RF transceiver signal in the connecting line between the transceiver & control unit and the compensator; an antenna interface provided at the compensator configured to transmit an antenna output signal with a variable output power; and a bidirectional communication line configured to provide a bidirectional communication between the compensator and the transceiver & control unit, wherein the transceiver & control unit is configured to indicate to the compensator through the bidirectional communication line a desired value of the variable output power to be present at the antenna interface when the antenna output signal is output by the antenna interface.

12 Claims, 3 Drawing Sheets

(58) Field of Classification Search
CPC ....... H04B 1/38; H04B 1/40; H04W 52/0245; H04W 52/0267; H04W 52/04
See application file for complete search history.

(56) References Cited

U.S. PATENT DOCUMENTS

| | | | |
|---|---|---|---|
| 2013/0090077 A1* | 4/2013 | Rozenblit | H03H 21/0001 455/127.2 |
| 2016/0044601 A1* | 2/2016 | Dykyy | H04W 24/02 455/522 |
| 2017/0294930 A1 | 10/2017 | Langbein et al. | |
| 2018/0152898 A1* | 5/2018 | Gossner | H04B 1/18 |

* cited by examiner

ANTENNA SYSTEM

CROSS-REFERENCE TO RELATED APPLICATIONS

The present application is a U.S. National Phase of International Patent Application Serial No. PCT/EP2020/063674, entitled "ANTENNA SYSTEM," filed on May 15, 2020. The entire contents of each of the above-referenced application are hereby incorporated by reference for all purposes.

TECHNICAL FIELD

The present application relates to an antenna system comprising a transceiver & control unit and a compensator connected to the transceiver & control unit. Furthermore, a method for operating the antenna system is provided.

BACKGROUND

In vehicles, it might be necessary to place an antenna at some distance from a control unit which controls the antenna and receives the radio frequency (RF) signals from the antenna and transmits RF signals for transmission. This leads to long connecting lines which have to be used to transmit the RF signals between the antenna and the corresponding control unit. In cases of coaxial lines, "long" can mean that they have a length greater than about 1 meter (m) for frequencies greater than about 5 gigahertz (GHz). To compensate for the attenuation on the transmission pass, it is possible to have a compensator which is able to compensate for these losses by amplification of the received RF signals.

Besides the amplification of the RF signals, it is also necessary to establish a communication channel between both entities, the control unit and the compensator. This communication channel is required, by way of example, for switching the mode of the antenna between a transmitting mode and a receiving mode.

A common application for such a remote antenna unit is for example antenna for a V2X communication, which has to be placed at an appropriate position of the vehicle in order to achieve a 360° coverage around the vehicle, which is not necessarily close to the control unit.

Accordingly, a need exists to provide an effective way to control an antenna system and especially control the output power provided at the antenna interface.

SUMMARY

This need is met by the features of the independent claims.

Further aspects are described in the dependent claims.

According to a first aspect, an antenna system is provided comprising a transceiver & control unit configured to control the antenna system and to generate a RF transceiver signal. The antenna system furthermore comprises a compensator connected to the transceiver & control unit through a connecting line, wherein the compensator is configured to compensate for signal losses occurring in the RF transceiver signal in the connecting line between the transceiver & control unit and the compensator. Furthermore, an antenna interface is provided at the compensator configured to transmit an antenna output signal with a variable output power. Furthermore, a bidirectional communication line is present configured to provide a bidirectional communication between the compensator and the transceiver & control unit. The transceiver & control unit is configured to indicate to the compensator through the bidirectional communication line a desired value of the variable output power to be present at the antenna interface when the antenna output signal is output by the antenna interface.

With this antenna system, an effective control of the antenna output power is available as the transceiver & control unit can directly indicate to the compensator which value should be present at the antenna interface, especially which output power. There exist situations where the output power generated by the antenna system should not exceed a certain value. With the bidirectional communication line in which the transceiver & control unit directly informs the compensator what output power should be present at the antenna interface, an effective and fast control of the antenna output power is obtained. Furthermore, the antenna system is flexible, as it might be used with fixed gain compensators and variable gain compensators.

Furthermore, a method for operating the antenna system is provided, wherein the transceiver & control unit indicates through the bidirectional communication line the desired value of the variable output power to be present at the antenna interface when the antenna output signal is output by the antenna interface. The compensator then uses the indicated desired value and provides the desired value of the variable output power at the antenna interface.

It is to be understood that the features mentioned above and features yet to be explained below can be used not only in the respective combinations indicated but also in other combinations or in isolation without departing from the scope of the present application. Features of the above-mentioned aspects and embodiments described below may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION OF EMBODIMENTS

Figure 1:
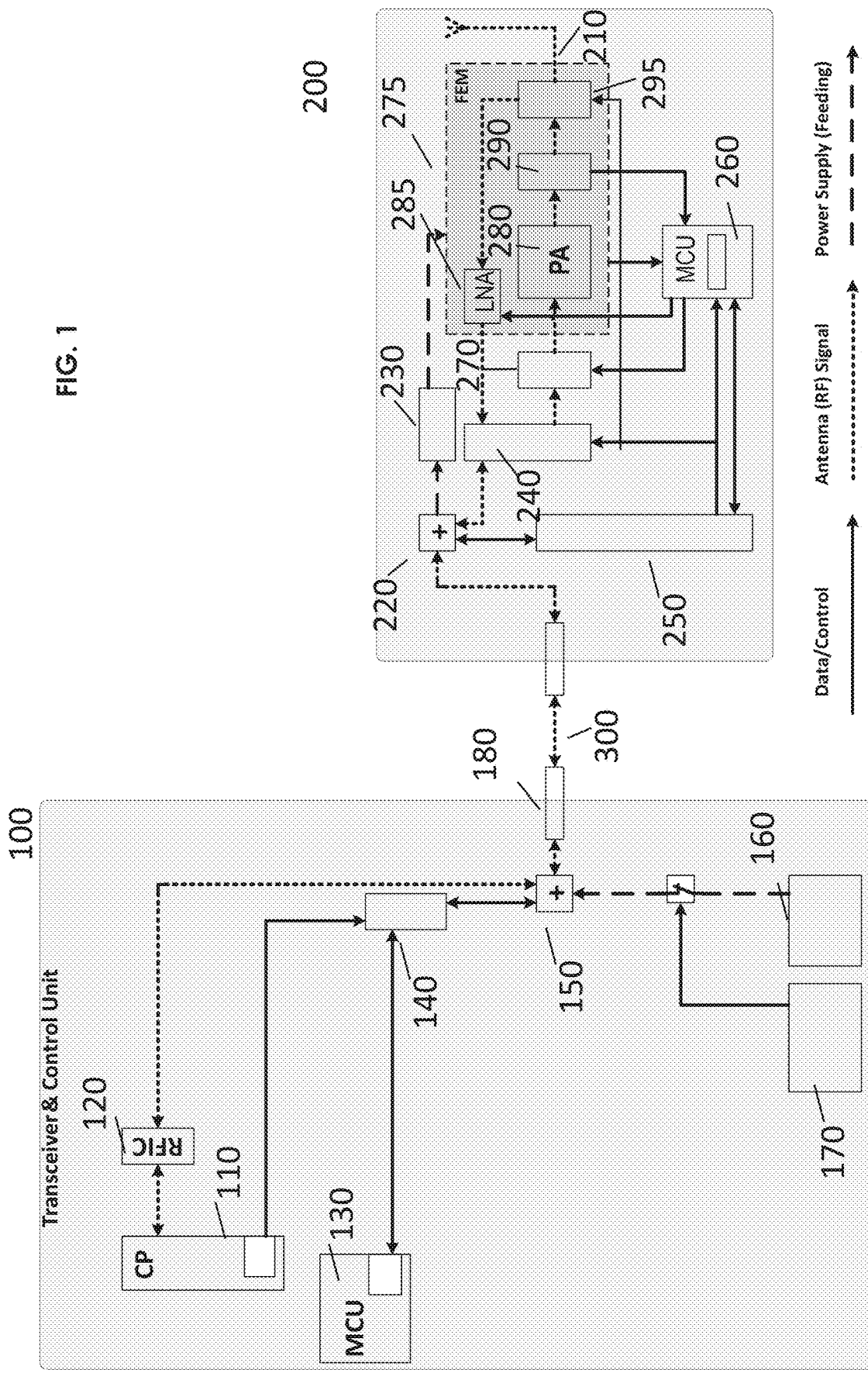
FIG. 1 shows a schematic view of an antenna system having a bidirectional communication line which provides an effective control at the output power at the antenna interface.

In the following, aspects of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

FIG. 1 shows a schematic view of an antenna system comprising a transceiver & control unit 100 and a compensator 200. The two components are connected via a connection 300 (which may be a transmission path, a communication line, and/or a bidirectional communication line, and which may be a single line), which can be implemented as coaxial cable. The cable plays the role of a connecting line connecting the compensator and the transceiver & control unit and plays the role of a bidirectional communication line between the compensator 200 and the transceiver & control unit 100. The system may be implemented in a vehicle, however, it may be used in any other system where there is a larger distance between the transceiver & control unit 100 and the compensator 200. A larger distance can mean more than 50 centimeters (cm) or more than 1 m.

As will be explained below, the transceiver & control unit 100 provides a transmit power to be output by an antenna interface 210 provided at the compensator 200. The compensator 200 is configured to compensate for signal losses occurring in the connection 300.

In the following, the transceiver & control unit 100 will be explained in more detail. The transceiver & control unit 100 comprises a communication processor or modem 110, where a radio frequency signal is generated that is to be output by the antenna interface 210. In the same way, the communication processor or modem 110 receives the RF signal received by the antenna interface 210. The RF signal generated by the communication processor or modem 110 is fed to a radio-frequency integrated circuit (RFIC) 120. The communication processor or modem 110 furthermore provides a switching signal in order to switch between the transmit or receive mode. Furthermore, a controller 130 is provided, which is responsible for controlling the data communication (command & control, status) between the transceiver & control unit 100 and the compensator 200. The controller 130 receives different pieces of information from the compensator 200 such as the receiver gain, transmitter signal strength indicator (TSSI), and any other information as determined by the compensator such as the temperature or any diagnosis data requested by the transceiver & control unit from the compensator 200 and thus transmitted from the compensator as will be explained further in detail below. Furthermore, the controller 130 determines the output power to be output at the antenna interface 210 and provides the output power to be present at the antenna interface 210 to the compensator 200. Accordingly, the controller 130 controls the output power at the antenna interface itself. Accordingly, the controller is able to control the parameters on the compensator side using the connection 300. This is especially helpful in situations where a certain output power should not be exceeded at the antenna interface 210. Based on the environmental conditions, situations exist where the output power of an antenna signal should not exceed a certain value, by way of example, in a situation of receivers located in the neighborhood collecting information from vehicles in the neighborhood such as toll stations for paying a toll.

The switching signal from the communication processor or modem 110 and the other parameters transmitted by the controller 130 or received by the controller 130 are fed to a modulator/demodulator 140 before being fed to adder 150 which combines the RF signal and the control signals. In the same way, the adder 150 separates the RF signal as received from the compensator in order to transmit the RF signal to RFIC 120 and in order provide the other pieces of information to the controller 130. Furthermore, a power supply 160 and the power supply control unit 170 is provided. The power supply supplies power to the transceiver & control unit 100 and also to the compensator 200 via the communication line. Accordingly, at an interface 180 (which may be an output), a RF transceiver signal is present together with the signal for the power supply and any communication signal exchanged between the 2 entities, which are transmitted to the compensator via connection 300 implemented as single line.

In the following, the compensator 200 is explained in more detail. At the beginning, the transmission path for the RF signals as received from the transceiver & control unit 100 is explained in more detail. The combined RF signal and control components are received by the compensator 200 and in an adder 220. The signal components are separated so that the DC voltage is provided to a voltage regulator 230. The RF signal is fed to a switch 240 and the control signals such as the switching between transmit and receive mode or any other data such as a request for diagnosis data is fed to a demodulator/modulator 250. The switching signal between transmit and receive mode is also fed to switch 240, switch 295 and to a control unit 260 (which may be a controller), which plays the role of the controller of the compensator 200. When the switch 240 is switched to the transmit mode, the RF signal is fed to an attenuator 270 (which may be a power attenuator), power amplifier 280 and power detector 290. The power detector detects the transmit signal strength such as the TSSI. Furthermore, the control unit 260, which may be a micro control unit, also receives the desired output power (provided by the transceiver & control unit via the communication channel) from the demodulator/modulator 250. The control unit 260 is then configured to control the attenuator 270 such that, based on the information provided by the power detector 290, a certain output power is obtained at antenna interface 210.

As far as the receiving side is concerned, the RF signal as detected by the antenna interface 210 is fed from the switch 295 to an amplifier 285, which may be implemented as low noise amplifier. The received signal then passes through switch 240 until it is received by adder 220, where the RF signal and the control signals are combined for a transmission through the connection 300.

In the embodiment shown, the compensator is implemented as a variable gain compensator. Accordingly, when the transceiver & control unit 100 provides a signal strength or output power to be used at the antenna interface 210, the compensator receives the RF transceiver signal as transmitted by the transceiver & control unit 100 with an unknown attenuation caused by the connection 300 but also receives the desired output power. The control unit 260, together with the attenuator 270, power amplifier 280 and power detector 290, then actively control the RF signal strength such that the desired output power is obtained at the antenna interface 210. This means that, in this embodiment, the control loop is provided within the compensator. However, it is also possible to use a fixed gain compensator in which the compensator 200 is configured to only provide a fixed gain to the signal as received from the transceiver & control unit 100.

In this situation, the controller 130 provides the gain to be applied by the compensator. The compensator then applies this fixed gain and also detects the output power by using power detector 290. This information is then fed back to the transceiver & control unit 100, which then knows how to adapt the output power present at the interface 180 of the transceiver & control unit 100 such that the desired output power is obtained at the antenna interface 210. The controller 130 knows which output power was provided at the interface 180 and knows the output power at antenna interface 210. It can thus determine the attenuation occurring in the connection 300. The output power at the transceiver & control unit 100 can then be adapted such that the desired output power is obtained at the antenna interface 210. In this example, the control loop includes the compensator and the transceiver & control unit.

Figure 2:
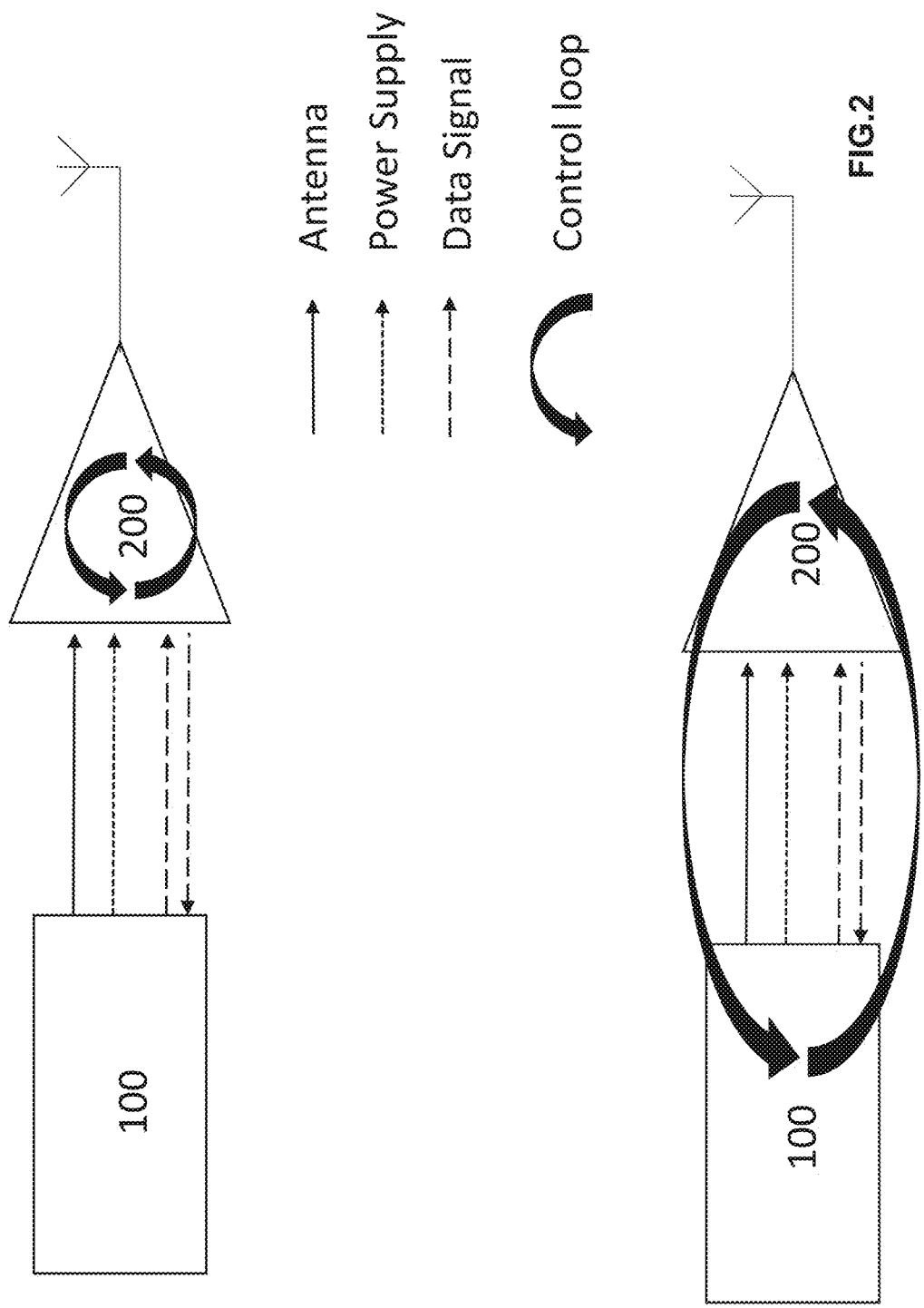
FIG. 2 shows a schematic view of a system as shown in FIG. 1 with either a fixed gain compensator or a variable gain compensator and the corresponding control loops.

This is reflected by FIG. 2 where in the upper part the control loop with a variable gain compensator is restricted to the compensator alone, wherein in the lower part the control loop includes the transceiver & control unit and the compensator.

As explained above, the system either with a fixed gain compensator or a variable gain compensator allows to control the transmit output power at the antenna interface itself. Using the bidirectional communication from the transceiver & control unit 100 to the compensator 200 and vice versa, it is possible to directly control the parameters on the compensator side. Accordingly, the output power at the antenna interface 210 is independent from the output power at transceiver & control unit 100. Accordingly, it is possible in an effective way to set the antenna output power to certain levels depending on the environmental conditions such as depending on the location of the antenna system.

The bidirectional communication line furthermore allows the transmission of a request for dedicated diagnosis parameters from the compensator 200. The connection 300 allows the transceiver & control unit to have a full control of which parameters have to be sent back as well as the point in time when the data is needed on the side of the transceiver & control unit 100.

The communication line to the compensator can be used not only for transmitting control signals but also for transmitting bulk data such as a software update which is needed by the compensator and which may be used to update the control software provided in the control unit 260. This allows an update of the software of the compensator via its single interface without the need of disassembling or exchanging the compensator but by just applying remote software update mechanisms while the different units stay assembled.

A further advantage can be seen in the fact that the concept discussed above has the flexibility of supporting various kinds of compensator modules. This makes the design of the transceiver & control unit independent from the used compensator since it minimizes the customizing efforts on the transceiver & control unit side or avoids the need to have different variants for the transceiver & control unit and provides support for different compensator modules.

This flexibility is helpful to decouple the development of the transceiver & control unit from the development of the compensator as far as possible.

The communication pattern between the transceiver & control unit 100 and the compensator 200 can be implemented as a master-slave communication pattern in which the transceiver & control unit 100 plays the role of the master with the compensator being the slave. However, it is also possible to use communication patterns in which both entities have the same relevance and the compensator is not a slave component but a communication is happening between two equal entities.

For the communication half-duplex on a single carrier frequency may be used or a full-duplex communication in different carrier frequencies. Furthermore, it is possible to use half-duplex serial communication in a baseband.

As far as the physical layer coding is concerned, a non-return-to-zero (NRZ) coding, a pulse width modulation (PWM), and/or a frequency/amplitude modulation (FM/AM) may be used. The communication line may be used for generating diagnosis data for the connection itself so that the transceiver & control unit is configured to detect whether there is a short to ground at the interface 180 of the transceiver & control unit 100. Furthermore, the transceiver & control unit 100 is configured to detect an open line meaning that no antenna or compensator is connected or the connection 300 is broken. Furthermore, the transceiver & control unit is able to check the operability of the compensator, by way of example, by receiving cyclic heartbeat messages from the compensator via the communication line. Furthermore, it can request a diagnosis from the compensator by asking for the temperature occurring at the compensator. Furthermore, it may ask for the status of the frontend module 275 and of the control unit 260, whether there is an error state or any other malfunction. Further, it may request the antenna status at the antenna interface and can request the transmit or receive parameters present at the antenna interface 210.

Figure 3:
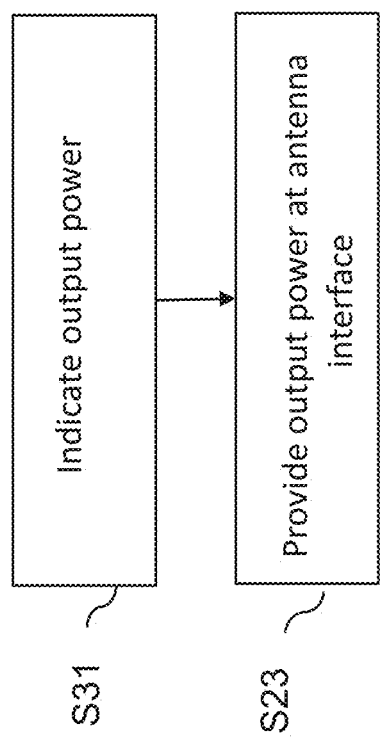
FIG. 3 shows an example flowchart of a method carried out by the antenna system shown in FIG. 1 or FIG. 2.

FIG. 3 summarizes some of the main steps carried at the antenna system discussed in FIG. 1. In step S31, the transceiver & control unit 100 indicates through the bidirectional communication line the desired value of the output power to be present at the antenna interface. In next step S32, the compensator then provides the desired value of the output power at the antenna interface.

For implementing step S32, as discussed above, the compensator may be implemented as a variable gain compensator which, with an internal control loop, adapts the RF signal as received from the transceiver & control unit 100 such that the desired output power is present at the antenna interface 210. In another example, the compensator may be a fixed gain compensator which applies a fixed gain to the RF signal as received from the transceiver & control unit. With the knowledge of the actual output power at the antenna interface 210 and with the knowledge of the output power at the transceiver & control unit at interface 180, the transceiver & control unit 100 is able to adapt the antenna signal within the transceiver & control unit such that, at the end, at the antenna interface 210, the desired output power is obtained.

From the above said, some general conclusions can be drawn.

The antenna system may have a connecting line connecting the compensator and the transceiver & control unit together. Furthermore, a bidirectional communication line is provided which provides the bidirectional communication between the two entities. The two lines—the connecting line and the communication line—may be implemented as a single line which is configured to transmit the RF transceiver signal and the control signal indicating the desired value of the variable output power to be present at the antenna interface 210.

The transceiver & control unit 100 may be configured to request diagnosis data indicating an operating status of the compensator from the compensator through this single line, wherein the transceiver & control unit is configured to receive the diagnosis data as sent from the compensator through the single line in response to the request. The data may then be interpreted by the controller 130 as needed.

The compensator 200 may be configured as a variable gain compensator configured to apply a variable gain to the RF transceiver signal in order to obtain the desired value of the output power at the antenna interface as received from the transceiver & control unit.

In a further example, the compensator may be implemented as a fixed gain compensator configured to apply a fixed gain to the RF transceiver signal in order to obtain the desired value of the output power at the antenna interface as requested from the transceiver & control unit. Here, the compensator 200 is configured to inform the transceiver & control unit 100 of the actual output power present at the antenna interface, wherein the actual output power is transmitted via the bidirectional communication line to the transceiver & control unit 100.

Furthermore, the compensator 200 may be configured to transmit a heartbeat message through the bidirectional communication line to the transceiver & control unit 100 indicating whether the compensator is operating normally. The transceiver & control unit is configured to determine the operating status of the compensator based on the heartbeat indication message.

Furthermore, the transceiver & control unit may be configured to determine a position dependent maximum output power allowed at the antenna interface. The transceiver & control unit can then determine the variable output power such that the value of the variable output power is not higher than the corresponding position dependent maximum output power at the position of the antenna system. The geographical position alone or together with the maximum output power may be provided by a navigation system to the transceiver & control unit or may be determined by the transceiver & control unit itself. Furthermore it is possible that the transceiver & control unit receives a request via the received RF signal to lower the RF transmission signal power to not to exceed a certain transmission power, e.g. from a toll booth entity located next to the road which monitors the toll or which is configured to charge the toll when a vehicle with the transceiver & control unit passes the toll booth. Furthermore, the transceiver & control unit may be configured to transmit a software update for the compensator through the bidirectional communication line to the compensator. Furthermore, the transceiver & control unit is configured to provide a power supply to the compensator through this single line.

The communication between the transceiver & control unit 100 and the compensator 200 may be implemented via the bidirectional communication line as a master/slave communication in which the transceiver & control unit is the master and the compensator is the slave.

Furthermore, the transceiver & control unit 100 may be configured to determine whether the compensator 200 is actually connected to the transceiver & control unit through the connecting line and if the connection line itself is working properly.

The above discussed concept provides an effective control of the output power and as flexible as a fixed gain compensator or a variable gain compensator may be used and as a bidirectional communication is provided.

The invention claimed is:

1. An antenna system comprising:
a transceiver and control unit operable to control the antenna system and to generate a RF transceiver signal;
a compensator connected to the transceiver and control unit through a connecting line, the compensator being operable to compensate for signal losses occurring for the RF transceiver signal in the connecting line between the transceiver and control unit and the compensator;
an antenna interface provided at the compensator operable to transmit an antenna output signal with a variable output power; and
a bidirectional communication line operable to provide a bidirectional communication between the compensator and the transceiver and control unit,
wherein the transceiver and control unit is operable to indicate to the compensator through the bidirectional communication line a desired value of the variable output power to be present at the antenna interface when the antenna output signal is output by the antenna interface,
wherein the connecting line and the bidirectional communication line are implemented as a single line operable to transmit the RF transceiver signal and a control signal indicating the desired value of the variable output power, and
wherein the transceiver and control unit is operable to request diagnosis data indicating an operating status of the compensator from the compensator through the single line and to receive the diagnosis data sent from the compensator through the single line in response to the request.

2. The antenna system according to claim 1, wherein the compensator is operable as a variable gain compensator to apply a variable gain to the RF transceiver signal in order to obtain the desired value of the variable output power at the antenna interface as received from the transceiver and control unit.

3. The antenna system according to claim 1, wherein the compensator is operable as a fixed gain compensator to apply a fixed gain to the RF transceiver signal in order to obtain the desired value of the variable output power at the antenna interface as intended by the transceiver and control unit, and wherein the compensator is operable to inform the transceiver and control unit of an actual output power present at the antenna interface via the bidirectional communication line.

4. The antenna system according to claim 1, wherein the compensator is operable to transmit a heartbeat message through the bidirectional communication line to the transceiver and control unit indicating whether the compensator is operating normally, the transceiver and control unit being operable to determine the operating status of the compensator based on the heartbeat message.

5. The antenna system according to claim 1, wherein the transceiver and control unit is operable to determine a position dependent maximum output power allowed at the antenna interface, and wherein the transceiver and control unit is operable to determine the variable output power such that the desired value of the variable output power is not higher than the position dependent maximum output power allowed at the antenna interface.

6. The antenna system according to claim 5, being operable to determine the position dependent maximum output power from an RF receiving signal received at the antenna interface.

7. The antenna system according to claim 1, wherein the transceiver and control unit is operable to transmit a software update for the compensator through the bidirectional communication line to the compensator.

8. The antenna system according to claim 1, wherein the transceiver and control unit is operable to provide a power supply to the compensator through the single line.

9. The antenna system according to claim 1, wherein a communication between the transceiver and control unit and the compensator via the bidirectional communication line is implemented with a master/slave communication scheme, with the transceiver and control unit being a master and the compensator being a slave.

10. The antenna system according to claim 1, wherein the transceiver and control unit is operable to determine whether the compensator is properly connected to the transceiver and control unit through the connecting line.

11. An antenna system comprising:
- a transceiver and control unit operable to control the antenna system and to generate a RF transceiver signal;
- a compensator connected to the transceiver and control unit through a connecting line, the compensator being operable to compensate for signal losses occurring for the RF transceiver signal in the connecting line between the transceiver and control unit and the compensator;
- an antenna interface provided at the compensator operable to transmit an antenna output signal with a variable output power; and
- a bidirectional communication line operable to provide a bidirectional communication between the compensator and the transceiver and control unit,
- wherein the transceiver and control unit is operable to indicate to the compensator through the bidirectional communication line a desired value of the variable output power to be present at the antenna interface when the antenna output signal is output by the antenna interface, and
- wherein the compensator is operable to transmit a heartbeat message through the bidirectional communication line to the transceiver and control unit indicating whether the compensator is operating normally, the transceiver and control unit being operable to determine an operating status of the compensator based on the heartbeat message.

12. An antenna system comprising:
- a transceiver and control unit operable to control the antenna system and to generate a RF transceiver signal;
- a compensator connected to the transceiver and control unit through a connecting line, the compensator being operable to compensate for signal losses occurring for the RF transceiver signal in the connecting line between the transceiver and control unit and the compensator;
- an antenna interface provided at the compensator operable to transmit an antenna output signal with a variable output power; and
- a bidirectional communication line operable to provide a bidirectional communication between the compensator and the transceiver and control unit,
- wherein the transceiver and control unit is operable to indicate to the compensator through the bidirectional communication line a desired value of the variable output power to be present at the antenna interface when the antenna output signal is output by the antenna interface, and
- wherein the transceiver and control unit is operable to determine a position dependent maximum output power allowed at the antenna interface, and wherein the transceiver and control unit is operable to determine the variable output power such that the desired value of the variable output power is not higher than the position dependent maximum output power allowed at the antenna interface.

* * * * *